United States Patent [19]

Clarkson et al.

[11] Patent Number: 4,907,413

[45] Date of Patent: Mar. 13, 1990

[54] REGENERABLE CRYOSORPTION PUMP WITH MOVABLE PHYSICAL BARRIER AND PHYSICAL BARRIER THEREOF

[75] Inventors: Ian Clarkson, Huntington; Bruce Abel, Sayville; Douglas W. Sedgley, Bethpage, all of N.Y.

[73] Assignee: Grumman Aerospace Corporation, Bethpage, N.Y.

[21] Appl. No.: 201,765

[22] Filed: Jun. 2, 1988

[51] Int. Cl.$^4$ .............................................. B01D 8/00
[52] U.S. Cl. ...................................... 62/55.5; 55/269; 62/100; 62/268; 417/901
[58] Field of Search .................. 62/55.5, 100, 268; 55/269; 417/901

[56] References Cited

U.S. PATENT DOCUMENTS

| | | | |
|---|---|---|---|
| 2,985,356 | 5/1961 | Beecher | 62/55.5 |
| 3,019,809 | 2/1962 | Ipsen et al. | 62/55.5 |
| 4,072,025 | 2/1968 | Thibault | 62/55.5 |
| 4,198,829 | 4/1980 | Carle | 62/55.5 |
| 4,438,632 | 3/1984 | Lessard et al. | 417/901 |
| 4,724,677 | 2/1988 | Foster | 62/55.5 |

Primary Examiner—Ronald C. Capossela
Attorney, Agent, or Firm—Scully, Scott, Murphy & Presser

[57] ABSTRACT

A regenerable cryosorption pump with a movable physical barrier in which the barrier includes a cylindrical body closed at one end and having a circumferential baffle around the open end. The baffle engages a flange on the hydrogen isotope condensing and pumping surface to require all gases entering the pump during normal operation to pass through the hydrogen isotope condensing and pumping surface, thus avoiding bypass of that surface. The barrier is advanced by a bellows system to isolate the hydrogen isotope condensing and pumping surface from the sorbent surface during regeneration and thus ensuring separation of hydrogen isotopes such as tritium from helium which is sorbed onto the sorbent surface.

19 Claims, 3 Drawing Sheets

REGENERABLE CRYOSORPTION PUMP WITH MOVABLE PHYSICAL BARRIER AND PHYSICAL BARRIER THEREOF

BACKGROUND OF THE INVENTION

1. Field of the Invention

The present invention relates to cryopumps, and more particularly, to cryosorption pumps for use in fusion reaction systems wherein the pump is provided with a physical barrier.

2. Discussion of the Prior Art

Cryosorption pumps for use in fusion reaction systems are known in the art, and encompass such types of pumps with or without the incorporation of physical barriers. The pumps which include physical barriers have provisions for regeneration and generally separate helium from isotopes of hydrogen by providing a sorbent surface for capturing the helium molecules while condensing the hydrogen isotopes onto a second surface. Regeneration takes place by simultaneously warming both surfaces and using a separate rough pumping system to pump out the sorbed gases.

The physical barriers of the prior art pumps separate the surfaces from each other during regeneration, but the separation is incomplete under high pressure conditions, such as upon the occurrence of a system failure or line rupture. The hydrogen isotopes, namely deuterium and tritium, may escape the condensing surface and reach the sorbent surface, the latter of which is generally charcoal, but may also include zeolite, and other gas impurities may also reach the sorbent surface. The cryopump design must allow for rapid venting of the cryogens in the event of any inadvertent warming which would result in the event of such a failure. Rapid venting may be accomplished by several methods, such as through the utilization of relief valves, burst discs, and appropriately sized vent lines.

Furthermore, prior art cryopumps with physical barriers generally do not overcome the problem of bypass flow of incoming gases that escape the condensing surface during normal operation of the pump which allows hydrogen isotopes to bypass that surface and reach the sorbent surface. The barriers are generally removed from the area where sorption takes place and do not participate in the normal operation of the pump.

SUMMARY OF THE INVENTION

The present invention eliminates or substantially ameliorates the disadvantages encountered in the prior art through the provision of a regenerable cryosorption pump with a physical barrier which eliminates bypass paths between the hydrogen isotope condensing surface and the sorbent surface during operation and regeneration of the pump, and whereby the barrier is movable so as to substantially isolate the two surfaces during regeneration of the pump.

The frequency of the regeneration process is dependent upon several factors, the primary factor being the amount of tritium present in the cryopump. Once the amount of tritium present in the pump approaches the maximum specified limit, it is required that all tritium be removed from the pump and be sent to a tritium processing system. During regeneration, the condensing surface and sorbent surface are simultaneously warmed and then separately pumped by rough pumping systems to remove the accumulated helium and tritium.

The cryopump of the present invention is provided with a movable physical barrier which serves to isolate the sorbent surface and hydrogen isotope condensing surface during regeneration. The physical barrier comprises a cylindrical body which is closed at one end and open at the other end. The open end has a circumferential baffle extending about the perimeter of the cylinder opening; whereas the closed end is connected to a bellows-type system which is mechanically lifted or pressurized so as to advance the barrier into a position for regeneration and subsequently lowered to retract the barrier into a rest or inactive position for normal pump operation.

The cryopump itself includes a housing which encloses the condensing and sorbent surfaces, whereby the sorbent surface is preferably constituted of charcoal, such as coconut charcoal, and is cooled to cryogenic temperatures by liquid helium. Charcoal has been found to be the best type of sorbent for pumping helium at liquid helium temperatures. The sorbent surface consists of a cylinder, and is connected to a liquid helium reservoir to maintain its temperature. The hydrogen isotope pumping or condensing surface coaxrally surrounds the charcoal surface, and is preferably a series of flat surfaces arranged to form an octagonally-shaped cylinder. The hydrogen isotopes, deuterium and tritium, are condensed onto these surfaces, each of which incorporates a chevron array and is cooled to cryogenic temperatures by a liquid helium reservoir which cools the sorbent surface constituted of charcoal. A liquid nitrogen-cooled chevron array is provided at the inlet to the cryopump so that all gases entering the cryopump must pass through this array, and water vapor and impure or contaminating gases such as hydrocarbons are pumped through this array.

During the operation of the cryopump, incoming gases pass through the liquid nitrogen chevron array and reach the hydrogen isotope (deuterium-tritium) pumping or condensing surface (hereinafter referred to as the "DT pumping surface"), and tritium and deuterium ions are then condensed onto this surface. The remaining gas passes through this DT pumping surface, which is also in a chevron arrangement, and reach the charcoal sorbent surface. Helium molecules are sorbed onto this surface. A feature of the present invention resides in that all gases entering the pump must pass through the DT pumping surface before reaching the charcoal sorbent. All paths circumventing the DT pumping surface are blocked off by the novel physical barrier of the present invention, such as to thereby ensure a very high separation rate of helium from the tritium flow.

When the barrier is in a rest or inactive position during the operation of the cryopump, the circumferential baffle extending about the open end of the barrier engages without touching an extended flange at the edge of the DT pumping surface. The interlocking action of the baffle and flange creates an impassable blockage to the gases, so as to render it impossible for the gases to pass around the DT pumping surface and reach the sorbent surface. If gases were to be allowed to pass around the surface, tritium might be sorbed onto the charcoal with the helium, and the desired separation would not be achieved; consequently, pursuant to the present invention, all gases must pass through the DT pumping surface prior to reaching the sorbent charcoal. Tritium and any deuterium present are condensed onto the DT pumping surface, and helium is sorbed onto the charcoal, and the separation is thereby accomplished, as desired.

Another problem in the separation process may be encountered during regeneration. When the barrier does not isolate the DT pumping surface from the charcoal sorbent, tritium may be repumped by the charcoal and the helium-tritium separation would not be complete. Tritium reaching the charcoal is sorbed by the charcoal and substantially reduces the pumping capability to remove all tritium during regeneration. In addition, incomplete isolation of the two surfaces during regeneration may allow impurities to reach the sorbent, also decreasing its effectiveness.

The present invention avoids this problem through the provision of the physical barrier having the circumferential baffle at the open end thereof. The barrier itself is cylindrical and has a larger diameter than the cylindrically shaped sorbent surface. The diameter of the barrier is smaller than the innermost diametrical dimension of the octagonally shaped DT pumping surface. The baffle at the open end engages a seating area on the frame of the pump housing so as to effectively seal the open end of the cylindrically-shaped barrier. The opposite end of the barrier is of course closed, and the charcoal sorbent is isolated from the DT pumping surface during regeneration so that the tritium and helium separation is achieved.

Accordingly, it is an object of the present invention to provide a regenerable cryosorption pump with a novel movable physical barrier which enhances the separation of helium from tritium in an incoming gas stream.

It is a further object of the present invention to provide a regenerable cryosorption pump with a movable physical barrier which prevents incoming gases from bypassing a hydrogen isotope condensing surface by blocking all paths around the surface so as to require the flow of gases to pass through the surface during operation of the pump.

It is still another object of the present invention to provide a regenerable cryosrption pump with a movable physical barrier which substantially isolates the sorbent surface from the hydrogen isotope condensing surface during regeneration.

It is yet another object of the present invention to provide a physical barrier for use in a regenerable cryosorption pump which prevents gases from bypassing the hydrogen isotope condensing surface during operation of the pump, and which is movable to isolate the sorbent surface from the hydrogen isotope condensing surface during regeneration of the pump.

BRIEF DESCRIPTION OF THE DRAWINGS

The foregoing objects and other features of the present invention will become more readily apparent and may be understood by referring to the following detailed description of an illustrative embodiment of the regenerable cryosorption pump with a physical barrier, taken in conjunction with the accompanying drawings, in which.

DETAILED DESCRIPTION OF THE PREFERRED EMBODIMENTS

Figure 1:
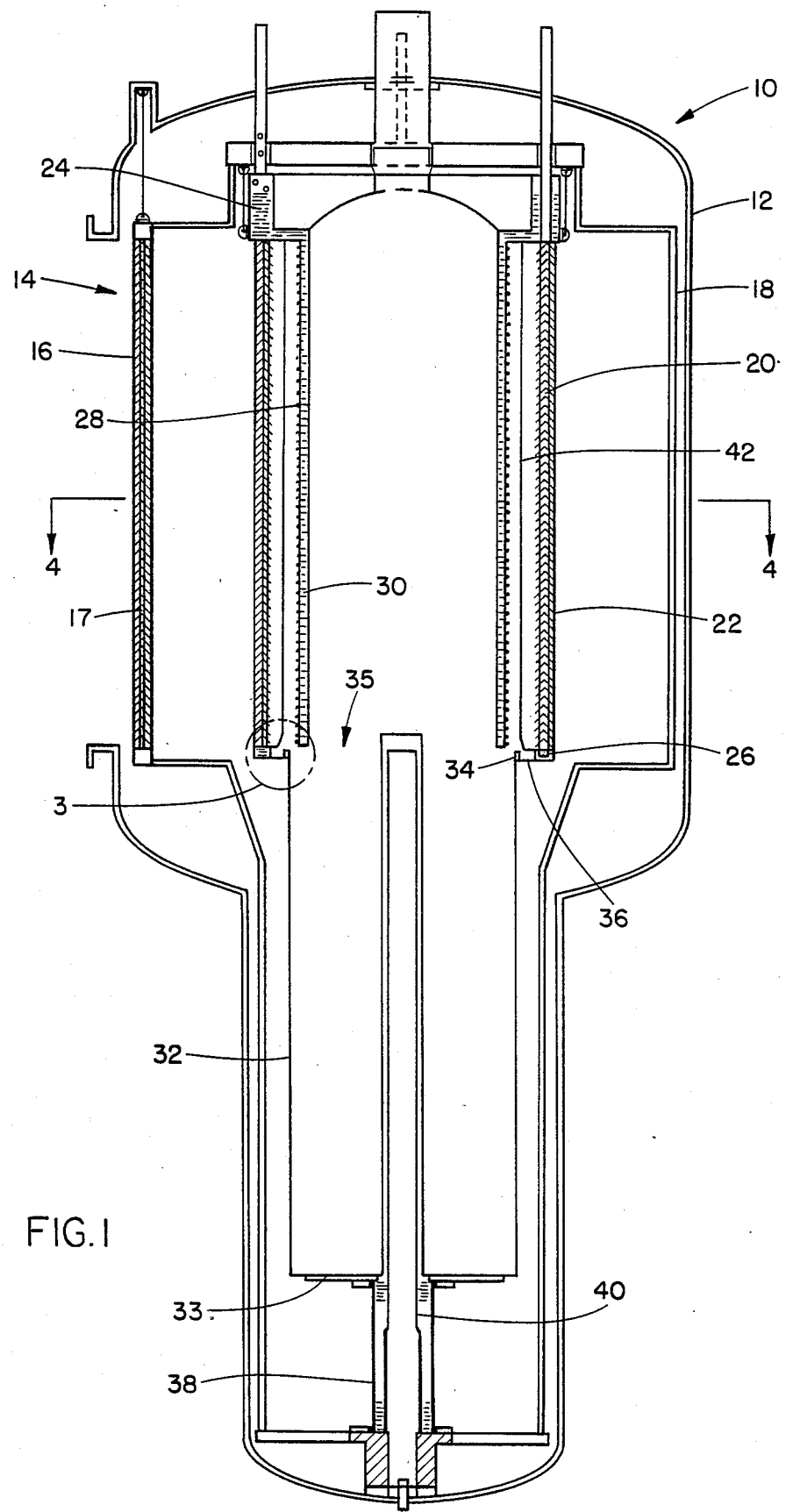
FIG. 1 illustrates a side cut-away view of a preferred embodiment of the cryosorption pump in an operating position.

Referring now in specific detail to the drawings, in which identical reference numerals identify similar or identical elements throughout the several views, FIG. 1 shows a preferred embodiment of the regenerable cryosorption pump 10 in an operating position. The pump essentially comprises an enclosure 12 which is provided with an inlet opening 14 for incoming gases from a fusion reactor system to which the pump is connected. Spanning inlet 14 is a liquid nitrogen cooled chevron array 16, which is cooled by liquid nitrogen contained in riser 17. All incoming gases pass through array 16 before entering the interior of the pump. The remainder of the pump is insulated by heat shield 18 which encompasses the interior of the pump enclosure 12 as shown.

Figure 4:
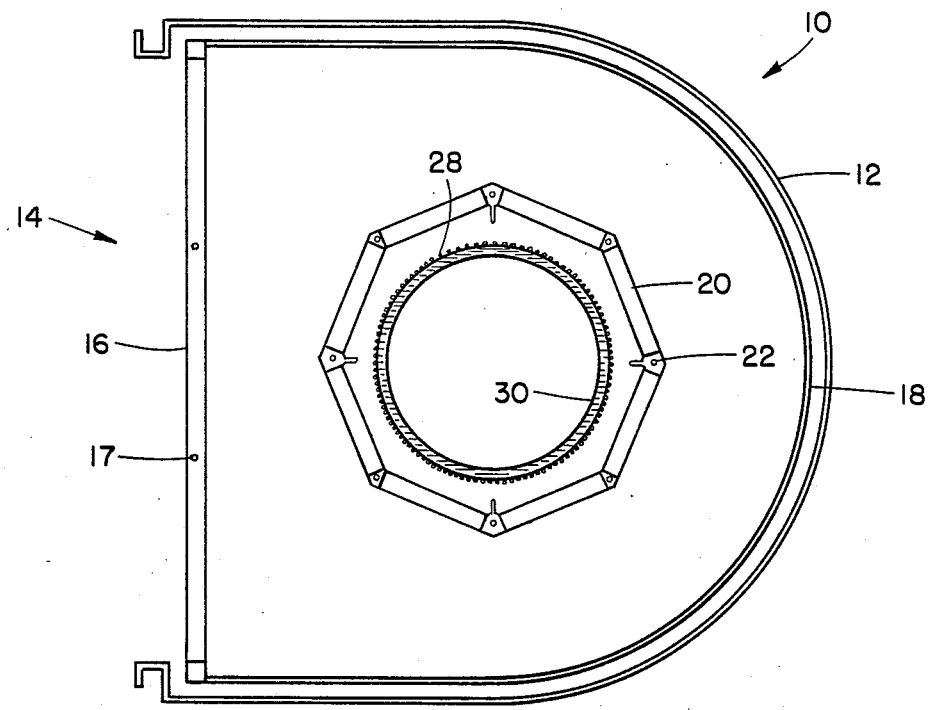
FIG. 4 illustrates a sectional view taken along line 4—4 in FIG. 1 showing the cryosorption pump in an operating position.

After passing through the array 16, the gases are conveyed to a second chevron array which comprises the hydrogen isotope pumping or condensing surface 20, which pumps hydrogen isotopes such as deuterium or tritium (DT). The isotopes condense on DT pumping surface 20, and are to be recovered from the stream or flow of the incoming gases for further processing. DT pumping surface 20 is cooled to cryogenic temperatures by liquid helium which is supplied to the DT pumping surface 20 via riser 22 which communicates with liquid helium reservoir 24 and terminates in reservoir 26. The DT pumping surface 20 is octagonally-shaped, as best seen in FIG. 4, and reservoirs 24 and 26 circumferentially enclose either end of the DT pumping surface 20.

After the gases pass through the DT pumping surface 20, the gases reach the sorbent surface 28, which is preferably coconut charcoal, or any other such material and which is cooled to cryogenic temperatures, for instance, about 4.2° K., by liquid helium from reservoir 24 contained in reservoir 30. As best seen in FIG. 4, the sorbent surface 28 is preferably cylindrically-shaped, as is the reservoir 30. Helium molecules in the gasstream are sorbed onto surface 28, and may be processed further after regeneration.

During operation of the pump 10, a physical barrier 32 is located in a rest or inoperative position as shown in FIG. 1. Barrier 32 is preferably cylindrically-shaped and has an inner diameter which is larger than the outer diameter of cylindrically-shaped sorbent surface 28, but smaller than the minor inner diameter of DT pumping surface 20. During operation of the pump, bellows 38 are in a retracted compressed position as shown in FIG. 1. The barrier 32 has a closed end 33 to which a bellows 38 is connected, and an open end 35 adjacent the condensing and sorbent surfaces.

As gases enter the pump by passing through liquid nitrogen cooled chevron array 16, the gases reach the DT pumping surface 20 at which tritium and deuterium are condensed. It is important that tritium and deuterium be separated out of the stream by the DT pumping surface 20 prior to reaching the sorbent surface 28, since any tritium in the stream will be sorbed onto the sorbent surface 28, and significantly reduce the surface effectiveness, as well as the ability to remove all tritium during regeneration. Furthermore, the tritium and helium sorbed together on sorbent surface 28 would then have to be separated at some further location for subsequent treatment or processing.

Gases which are present in the pump are capable of reaching any surface accessible to the gas. Accordingly, it is important to render all possible paths around the DT pumping surface 20 impassable to the gases, thus requiring all gases in the system to pass through DT pumping surface 20 prior to reaching the sorbent surface 28. As seen in Figure 1, DT pumping surface 20 is secured to the frame of reservoir 24, effectively sealing any paths to the gas stream bypassing the DT pumping surface 20 at that end. However, the path most likely to be taken by the gas in order to bypass the DT pumping surface 20 would be around the end of surface 20 at reservoir 26. The present invention avoids this bypass problem through the provision of baffle 34 on barrier 32, which engages the flange 36 on the housing of reservoir 26.

Figure 3:
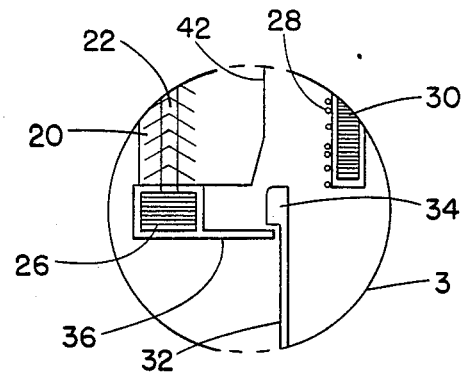
FIG. 3 illustrates an enlarged sectional view of the encircled area 3 in FIG. 1.

As best seen in FIG. 3, the baffle 34 is arranged at the outer perimeter of the open end 35 of barrier 32, and essentially comprises an outwardly extending lip. Flange 36 extends outwardly from reservoir 26 and is oriented perpendicular to the side wall of barrier 32. When the barrier 32 is in its rest or inoperative position and the pump is operating, baffle 34 engages flange 36, as seen in FIG. 1, so as to effectively form a seal against gases tending to bypass the DT pumping surface 20 to reach sorbent surface 28, thus rendering such path impassable and requiring all gases to pass through the DT pumping surface 20 prior to reaching the sorbent surface 28.

Figure 2:
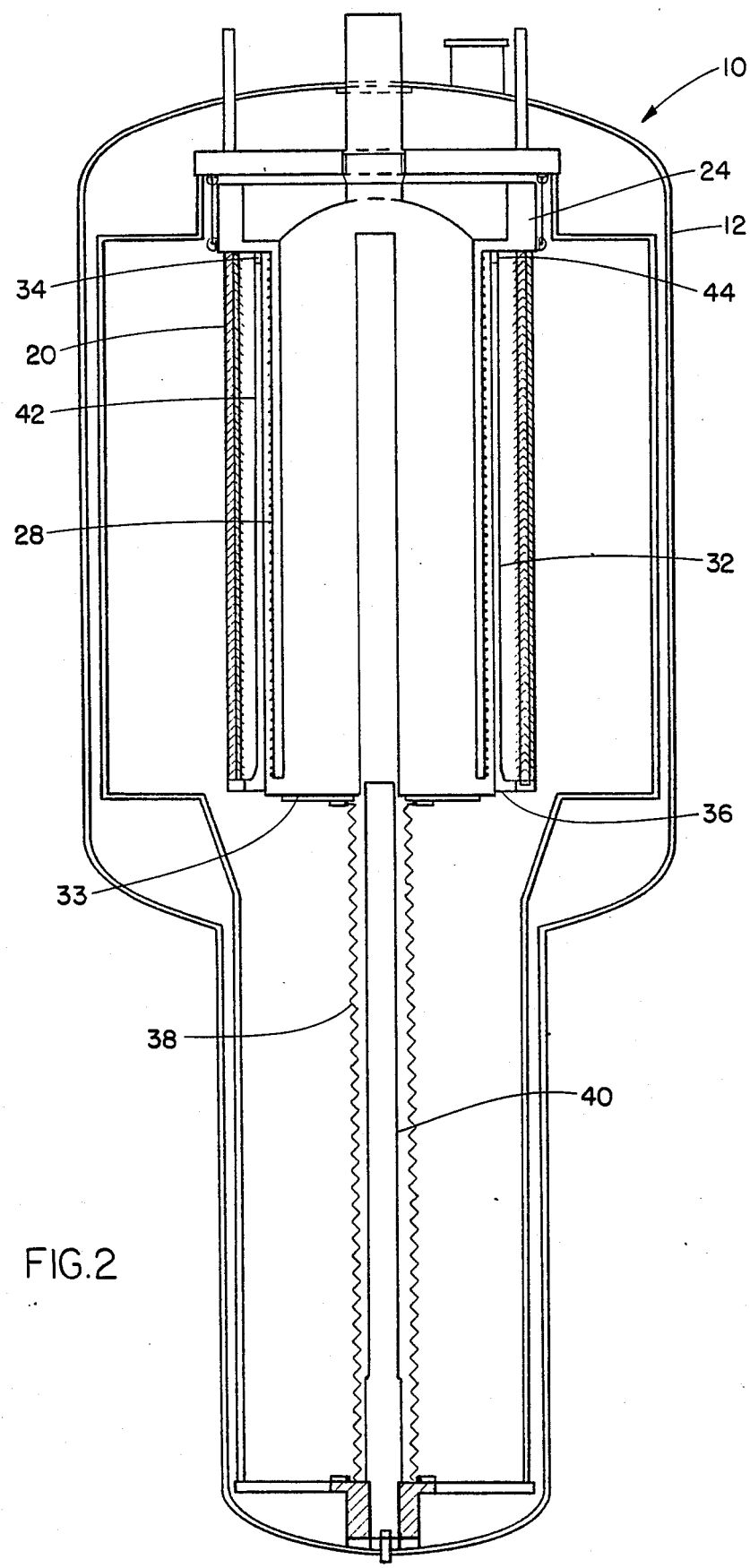
FIG. 2 illustrates a side cut-away view similar to FIG. 1 but with the cryosorption pump in a regenerating position.

When it is necessary to regenerate the pump 10, bellows 38 are pressurized, preferably by helium gas, so as to advance the barrier 32 or the barrier 32 is mechanically lifted into position for regeneration, as shown in FIG. 2. Barrier 32 is advanced along guide pipe 40 and guide lines 42 until it reaches the circumferential seating area 44, where baffle 34 engages the frame of reservoir 24 to thereby seal and isolate sorbent surface 28 from the DT pumping surface 20, and to prevent any re-pumping of tritium by sorbent surface 28 during regeneration of the pump. Of course, closed end 33 completes the isolation of the two surfaces. Barrier 32 coaxially encloses the sorbent surface 28, while at the same time being coaxially enclosed by the DT pumping surface 20, so that the three elements, i.e., the sorbent surface 28, the barrier 32 and the DT pumping surface 20, are concentric during regeneration. The regeneration then occurs by simultaneously warming DT pumping surface 20 and sorbent surface 28, and then sequentially pumping these surfaces by a rough pumping system (not shown). Upon completion of the regeneration, bellows 38 are depressurized and barrier 32 is retracted along guide pipe 40 and guide lines 42 back to its rest or inoperative position, so that normal operation of the pump may be resumed.

The regenerable cryosorption pump with a movable physical barrier pursuant to the present invention is a highly efficient pump for use in fusion reactor systems which ensures for maximum separation of helium and hydrogen isotopes. Inadvertent and undesirable sorption of hydrogen isotopes is avoided, such as tritium onto helium sorbent surfaces, thus increasing the effectiveness of the pump and increasing the time intervals between regeneration, allowing for longer pump operating times.

While the invention has been particularly shown and described with reference to the preferred embodiments, it will be understood by thoses skilled in the art that various modifications and changes in form and detail may be made therein without departing from the scope of the invention.

What is claimed is:

1. A regenerable cryopump for use in a fusion reactor system for separating helium from a tritium stream being processed, said pump provided with a housing and mounted to said reactor system, comprising:
   a sorbent surface for sorbing helium molecules;
   a deuterium-tritium (DT) pumping surface for pumping hydrogen isotopes;
   a pumping chambewr comprising a chevron separating array integrally connected with heat shielding means; and
   a movable cylindrical barrier;
   whereby said barrier is movable from a first position when said cryopump is in an operating mode to a second position isolating said sorbent surface from said DT pumping surface when said cryopump is in a regenerable mode to isolate said helium molecules from said hydrogen isotopes during regeneration.

2. A regenerable cryopump according to claim 1, wherein said sorbent surface is cylindrically shaped and comprises charcoal, said sorbent surface being cooled to cryogenic temperatures by a liquid helium reservoir.

3. A regenerable cryopump according to claim 2, wherein said sorbent surface is maintained at 4.2° K.

4. A regenerable cryopump according to claim 1, wherein said DT pumping surface coaxially encloses said sorbent surface, said DT pumping surface being cooled to cryogenic temperatures by a liquid helium reservoir.

5. A regenerable cryopump according to claim 1, wherein said DT pumping surface comprises a chevron array having one end secured to said pump housing and a second end terminating at a circumferential flange.

6. A regenerable cryopump according to claim 1, wherein said movable barrier in said first position separates said chevron array from said sorbent surface during the operating mode of said pump to prevent direct communication between incoming gases and said sorbent surface.

7. A regenerable cryopump according to claim 6, wherein said movable barrier includes a baffle for matingly engaging said circumferential flange of said DT pumping surface to separate said chevron array from direct communication with said sorbent surface when said barrier is in said first position during the operating mode of the pump to cause incoming gases to pass through said DT pumping surface prior to communication with said sorbent surface.

8. A regenerable cryopump according to claim 1, wherein said movable barrier in said second position thereof engages a seating area on said housing to isolate said sorbent surface from said DT pumping surface during regeneration.

9. A regenerable cryopump according to claim 1, wherein said movable barrier is cylindrically shaped and coaxially encloses said sorbent surface while in said second position during regeneration, said movable barrier being coaxially enclosed by said DT pumping surface while in said second position so as to isolate said sorbent surface from said DT pumping surface during regeneration.

10. A regenerable cryopump according to claim 9, wherein said movable barrier comprises a cylinder open at one end and closed at the other end, said open end including said baffle for engaging the flange of said DT pumping surface during operation of the pump and for engaging said seating area during regeneration.

11. A method of regenerating a cryopump having a movable cylindrical physical barrier, comprising:
  displacing said barrier from a storage position occupied during operation of said cryopump to a regeneration position intermediate a sorbent surface for sorbing helium molecules and a deuterium-tritium (DT) pumping surface for pumping hydrogen molecules, so as to isolate said sorbent surface from said DT pumping surface during regeneration;
  simultaneously warming said sorbent surface and said DT pumping surface;
  simultaneously but separately pumping molecules previously condensed and sorbed onto said surfaces to regenerate said pump; and
  retracting said barrier from said regeneration position to said storage position after regeneration to place said cryopump in operating condition.

12. A method according to claim 11, wherein said barrier is advanced and retracted by pressurization and depressurization of a bellows system.

13. A method according to claim 11, wherein said barrier is closed at one end and surrounds said sorbent surface during regeneration, said barrier engaging a seating area on a frame of said pump at a second end to isolate said sorbent surface from said DT pumping surface.

14. A method according to claim 11, wherein said barrier is advanced and retracted mechanically.

15. A movable physical barrier for use in a regenerable cryosorption pump having a sorbent surface for sorbing helium molecules and a pumping surface for sorbing hydrogen isotopes, said barrier comprising:
  a cylindrical body open at a first end and closed at a second end;
  a circumferential baffle at said first end; and
  a retractable bellows at said second end for advancing and retracting said barrier from a storage position during operation of said pump to an active position during regeneration of said pump.

16. A barrier according to claim 15, wherein said baffle separates an input path of said pump from said sorbent surface to cause said hydrogen isotopes from said input path to pass through said pumping surface.

17. A barrier according to claim 16, wherein said baffle mates with a circumferential flange provided on said pumping surface during operation of said pump.

18. A barrier according to claim 15, wherein said baffle engages a seating area on a frame of said pump to isolate said sorbent surface from said pumping surface during regeneration of said pump.

19. A barrier according to claim 15, wherein said bellows are pressurized to advance said barrier and depressurized to retract said barrier.

* * * * *